July 23, 1963
S. D. PHILLIPS
3,098,644
DOUBLE ACTING SPRING DEVICE
Filed May 1, 1962
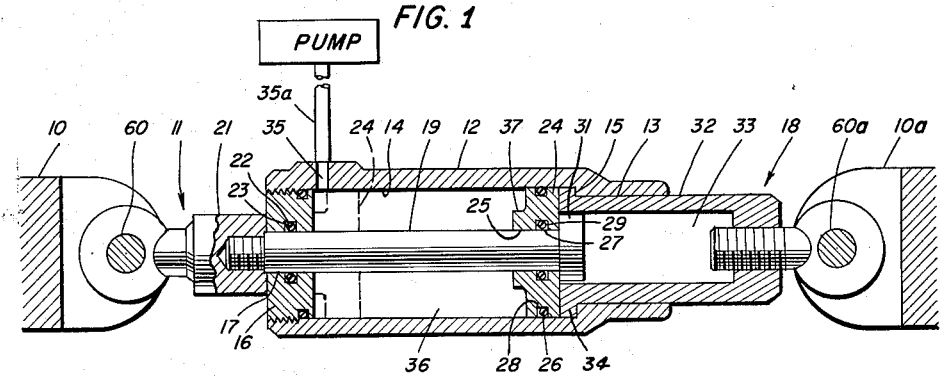
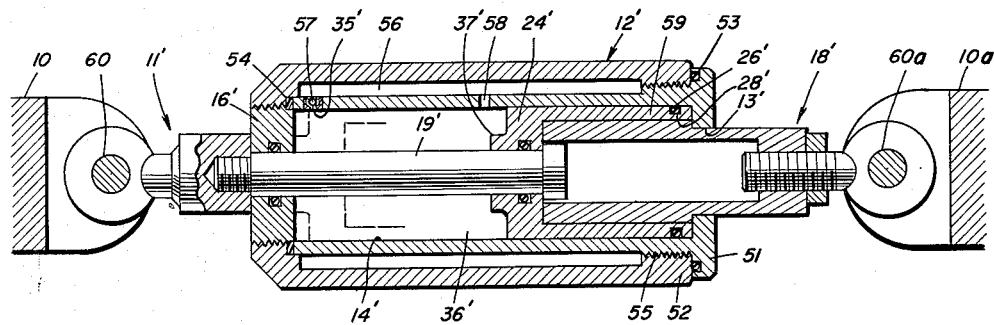
INVENTOR
Stanley D. Phillips
BY Claude Funkhouser
ATTORNEY

United States Patent Office 3,098,644
Patented July 23, 1963

3,098,644
DOUBLE ACTING SPRING DEVICE
Stanley D. Phillips, San Jose, Calif., assignor, by mesne assignments, to the United States of America as represented by the Secretary of the Navy
Filed May 1, 1962, Ser. No. 191,647
11 Claims. (Cl. 267—1)

The present invention relates to a double-acting spring or shock-absorbing device and more particularly to a spring or shock-absorbing device having a single piston for resisting both tensile and compressive loads.

An object of the present invention is to provide a spring device having two-directional operation with only one piston and one cylinder and having a minimum of moving or dynamic seals.

Another object is to provide a spring device having a combined expansion and contraction length which is twice the length of piston travel and is capable of being locked or made rigid.

A further object is to provide a spring device having high damping for both tension and compression strokes.

Other objects and many of the attendant advantages of this invention will be readily appreciated as the same becomes understood by reference to the following detailed description when considered in connection with the accompanying drawings in which like reference numerals designate like parts throughout the figures thereof and wherein:

FIG. 1 is a diagrammatic view, in vertical section, of the device.

FIG. 2 is a diagrammatic view, in vertical section, of a modification of the device.

Referring now to the drawings, there is shown in FIG. 1 an elongated body or cylinder 12 having an internal bore 13 extending completely through the cylinder. The bore 13 has an enlarged portion 14 which forms a retaining lip or shoulder 15 on the interior of body 12. A pair of elongated members 11 and 18 are connected to elements 10 and 10a respectively by pins 60, 60a and extend into the bore 13. One elongated member 11 has a rod 19 with an enlarged head 21 at one end. The head 21 is adapted to engage a cap or nut 16 which is screwed into the enlarged portion 14. The cap 16 has an opening 17 through which rod 19 slidably extends. A seal 22 is provided in an annular groove 23 in the cap 16. Thus cap 16 acts to block off and seal the bore 13, and together with head 21 acts as a stop means to limit the movement of the rod 19 into the cylinder. A piston 24 having an internal bore 25 is slidably mounted in the enlarged portion 14 of the bore 13. Rod 19 extends through opening 25, allowing the piston 24 to slide relative to the rod 19. Seals 26 and 27 are respectively seated in annular grooves 28 and 29 in the piston 24 for respectively sealing the juncture between the enlarged portion 14 and the piston 24 and between the piston 24 and the rod 19. The rod 19 terminates short of the end of the bore 13 and has an abutment 31. Abutment 31 engages piston 24 and is capable of moving the same to the left as seen in FIG. 1.

The other elongated member 18 has a plunger 32 having an elongated cavity 33, which clears or slides over abutment 31. Plunger 32 has a flange 34 which engages shoulder 15 within body 12 to limit the movement of member 18 out of bore 13, or to the right as viewed in FIG. 1. Piston 24 is engaged by plunger 32 and moved by it toward the other end of bore 13 or toward the left as viewed in FIG. 1.

The piston 24 with seals 26 and 27 and cap 16 with seal 22 defines a given volume or chamber 36 within enlarged portion 14. The chamber 36 contains a fluid, either liquid or gas. An opening or orifice 35 extends through body 12 and provides access to the chamber. The opening 35 is connected by conduit 35a to a compartment such as a tank or accumulator.

When elements 10 and 10a are moved apart, flange 34 of plunger 32 abuts against shoulder 15 in bore 13 and plunger 32 becomes fixed relative to body 12. Simultaneously, member 11 is moved to the left, causing abutment 31 on rod 19 to engage piston 24 and move it to the left. As piston 24 moves to the left, the chamber 36 in bore 13 becomes smaller forcing the fluid contained therein through opening 35. Because the area of the opening 35 is considerably smaller than the area of piston 24, the fluid cannot flow as rapidly through the opening 35 as it is being moved by the piston 24. Thus a resisting or damping force is applied to the piston 24 and the rate of separation between the members 10 and 10a is slowed and controlled.

When elements 10 and 10a are moved toward each other, head 21 abuts against cap 16 and becomes immobile. Simultaneously, plunger 32 is moved to the left which also moves piston 24 to the left. The chamber 36 is again decreased and the fluid contained therein is forced out of the bore 13 through opening 35.

Piston 24 has a raised portion or hub 37 which engages cap 16. The hub forms an open groove between the cap 16 and the outer edge of the piston as shown by the dotted line in FIG. 1. Opening 35 is positioned in body 12 to communicate with this groove. Fluid can enter the bore between the piston and the cap and move the piston back to its original position after the load is removed.

The modification shown in FIG. 2 is basically the same as the device in FIG. 1 with the addition of an accumulator and check valve arrangement which reacts to increase damping. The modification of FIG. 2 also has a body or cylinder 12' with a bore 13' having an enlarged portion 14'. A pair of elongated members 11' and 18', similar to members 11 and 18 in FIG. 1, have their free ends telescoped over one another inside bore 13'. Body 12' is composed of an inner cylinder 51 and an outer cylinder 52. The outer cylinder 52 fits over and is fastened to inner cylinder 51 by means of threads 55. The outer cylinder has, over a portion of its length, an inside diameter larger than the outer diameter of the inner cylinder, forming a space therebetween. Seals 53 and 54 are placed between the junction of the inner and outer cylinders and at the ends thereof. A cap 16' is fastened to outer cylinder 52 and closes off one end of bore 13'. A check valve 57 is placed in opening 35', which extends from the enlarged portion 14' of the bore 13' into space 56. Valve 57 allows fluid to flow only from the bore into the space 56. Opening 35' is placed in inner cylinder 51 in a position similar to that in FIG. 1. A second opening 58 extends through inner cylinder 51 connecting space 56 with chamber 36'. Piston 24' has an elongated skirt 59 with a seal 26' placed in a groove 28' near the bottom of the skirt. The distance from the top of the raised portion of piston 24' to the seal 26' is slightly greater than the distance from the inside of cap 16' to the second opening 58. Seal 26' cannot, therefore, close off or stop opening 58.

When piston 24' is moved to the left, as either a tensile or compressive load is applied to members 10 and 10a, the piston will first force fluid through both openings 58 and 35' into space 56. As the piston moves farther to the left, opening 58 will be covered and fluid will flow through check valve 57 in opening 35'. Pressure will increase in space 56 which acts as an accumulator. When the piston has reached the limit of its travel and the load removed, orificed flow of the fluid will occur through opening 58 between the inner cylinder 51 and the piston 24', to the groove formed by hub 37' between the piston 24' and the caps 16'. The pressure then returns the piston to its original position. The fluid used in the modification of FIG. 2 is compressible, i.e., either a gas or a combination of liquid and gas.

In either of the modifications shown, the device can be made effectively rigid until a certain loading is attained on members 10 and 10a by pressurizing the chamber 36' so that the force exerted on the piston by that pressure equals the desired preset loading. When this is done the piston will not move until the external force, either compressive or tensile, exceeds the internal pressure force on the piston. It is even possible with the modification shown in FIG. 1, to make the device rigid or free, as desired, by varying the pressure in the chamber by external means, such as a pump, connected to conduit 35a.

The amount of movement between the pins 60 and 60a or the members 10 and 10a will be twice the length of piston travel. For example, when the cylinder is designed for a piston travel of 6 inches, the pins 60 and 60a will be permitted a maximum differential or stroking length of 12 inches.

Obviously many modifications and variations of the present invention are possible in the light of the above teachings. It is therefore to be understood that within the scope of the appended claims, the invention may be practiced otherwise than as specifically described.

What is claimed is:

1. A device for controlling the relative approach and recession of two elements which comprises a body disposed between said elements and having a bore therethrough and containing a fluid, each of said elements having a member attached thereto and extending into and along said bore toward the other element, said members at their adjacent ends in said bore telescoping one another, a piston slidably mounted on one of said members, and said one of said members having means preventing removal of said piston from the free end of said one member, the other of said members clearing said one member and said means thereon and engaging said piston to shift the latter along said one member in a direction away from said removal preventing means, said body having a restricted opening from said bore for controlling the flow of said fluid into and out of said bore whereby the rate of approach and recession of said elements is controlled by said restrictive opening.

2. The device set forth in claim 1 in which said body has means for returning said piston toward said removal preventing means.

3. The device set forth in claim 2 in which said body further comprises means to limit the movement of said elements into and out of said bore.

4. A device for controlling the relative approach and recession of two elements which comprises a body disposed between said elements and having a bore therethrough and containing a fluid, said body having a restricted opening extending into said bore at one end thereof, each of said elements having a member attached thereto and extending into said bore, one of said members having a rod with a head on one end and an abutment on the other, a piston slidably mounted on said rod and in said bore, said piston being normally positioned adjacent the other end of said bore, said abutment engaging said piston for moving the same toward said one end of said bore, the other of said members having a hollow plunger slidably retained within said bore and telescoping said one member, said other member engaging said piston for moving the same toward said one end of said bore, whereby as said elements move relative to each other, said piston is moved toward said other end of said bore and said restricted opening controls the flow of said fluid from said bore whereby the rate of approach and recession of said elements is controlled.

5. A device for controlling the relative recession of two elements which comprises a cylinder disposed between said elements and having a bore therethrough, closure means retained in one end of said bore and sealing the same, a first member attached to one of said elements and having a rod extending into said bore and slidably mounted in said closure means, said rod having an enlarged head for limiting the travel of said rod into said bore, a piston slidably retained in said bore and mounted on said rod, said piston and said closure means defining a chamber within said bore, said cylinder having a restricted opening extending through the wall thereof and into said chamber, said chamber containing a fluid, an abutment on said rod and engaging said piston for moving said piston and decreasing said chamber, and means for attaching said cylinder to the other of said elements whereby as said elements are moved apart, said abutment engages and moves said piston to force said fluid through said opening thereby controlling the rate of recession of said elements.

6. The device in claim 5 in which the means for attaching said cylinder to the other of said elements controls the rate of approach of said elements, said means comprising a plunger attached to said other element and slidably retained in said bore, said plunger having a cavity slidable over said abutment and engaging said piston for moving the same to decrease said chamber whereby as said elements are moved toward each other said plunger will move said piston to force said fluid through said opening thereby controlling the rate of approach of said elements.

7. The device in claim 6 in which said piston has a raised central portion and said opening is located adjacent to said closure means whereby said opening will provide access to said chamber when said piston abuts said closure means.

8. The device in claim 4 in which a pressure means is connected to said opening whereby said fluid can return said piston to its normal position.

9. A device for controlling the relative approach and recession of two elements which comprises a body disposed between said elements and having an inner cylinder and an outer cylinder, said cylinders being concentric and having a confined space therebetween, said inner cylinder having a bore therethrough, each of said elements having a member attached thereto and extending into and along said bore toward the other element, said members at their adjacent ends in said bore telescoping one another, a piston slidably mounted on one of said members and said one of said members having means preventing removal of said piston from the free end of said one member, the other of said members clearing said one member and said means thereon and engaging said piston to shift the latter along said one member in a direction away from said removal preventing means, said body having a restricted opening connecting said bore to said confined space for controlling the flow of said fluid into and out of said bore whereby the rate of approach and recession of said elements is controlled by said restrictive opening.

10. The device of claim 4 in which said body has a confined space connected to said restricted opening.

11. The device of claim 10 in which the piston has an elongated skirt and said body has a second opening spaced from said restricted opening, said restricted opening having a check valve permitting flow only from said bore into said confined space whereby said piston will cover said second opening as it moves toward said restricted opening.

References Cited in the file of this patent

UNITED STATES PATENTS

| 2,985,443 | Smith | May 23, 1961 |
| 3,017,172 | Hartel | Jan. 16, 1962 |

FOREIGN PATENTS

| 1,087,419 | France | Feb. 23, 1955 |